United States Patent [19]
Kitagawa et al.

[11] Patent Number: 5,634,143
[45] Date of Patent: May 27, 1997

[54] CAMERA WITH IMPROVED POSITIONING OF VIBRATION DETECTION SENSORS

[75] Inventors: Yoshihisa Kitagawa, Kashiwa; Yoshio Imura, Kawasaki; Hidenori Miyamoto, Urayasu, all of Japan

[73] Assignee: Nikon Corporation, Tokyo, Japan

[21] Appl. No.: 704,146

[22] Filed: Aug. 28, 1996

Related U.S. Application Data

[63] Continuation of Ser. No. 377,989, Jan. 25, 1995, abandoned.

[30] Foreign Application Priority Data

Apr. 28, 1994 [JP] Japan .................. 6-092633

[51] Int. Cl.$^6$ .................. G03B 3/00; G03B 7/08
[52] U.S. Cl. .................. 396/52; 396/53; 396/55
[58] Field of Search .................. 354/430, 202, 354/288, 149.11, 486

[56] References Cited

U.S. PATENT DOCUMENTS

| | | | |
|---|---|---|---|
| 5,084,724 | 1/1992 | Maeno | 354/430 |
| 5,095,198 | 3/1992 | Nakazawa et al. | 250/201.8 |
| 5,210,563 | 5/1993 | Hamada et al. | 354/202 |
| 5,266,988 | 11/1993 | Washisu | 354/195.1 |
| 5,398,132 | 3/1995 | Otani | 359/557 |
| 5,416,554 | 5/1995 | Hamada et al. | 354/430 |
| 5,416,558 | 5/1995 | Katayama et al. | 354/430 |
| 5,426,478 | 6/1995 | Katagiri et al. | 354/149.11 |
| 5,463,443 | 10/1995 | Tanaka et al. | 354/430 |

FOREIGN PATENT DOCUMENTS

| | | |
|---|---|---|
| 63-125923 | 5/1988 | Japan. |
| 5-61091 | 3/1993 | Japan. |
| 5-61091 | 12/1993 | Japan. |

*Primary Examiner*—Safet Metjahic
*Assistant Examiner*—Michael Dalakis

[57] ABSTRACT

A camera, which detects and compensates for vibrations affecting the camera, has improved positioning of vibration detection sensors. The camera includes a camera body having an outer cover and a lens barrel. The lens barrel has a substantially cylindrical outer portion and is positioned on the camera body to divide the camera body into a first portion and a second portion with the lens barrel therebetween. A rangefinding unit is positioned in the camera body and is covered by the outer cover of the camera body. The rangefinding unit has a surface which has a portion opposing the circumference of the outer portion of the lens barrel. A first space exists in the first portion of the camera body and has borders defined by the circumference of the outer portion of the lens barrel, the surface of the rangefinding unit and the outer cover of the camera body. A flash generation device is positioned in the second portion of the camera body and a vibration detection sensor positioned in the first space. In this manner, space inside the camera is efficiently utilized and the amount of noise affecting the vibration detection sensor is reduced.

19 Claims, 11 Drawing Sheets

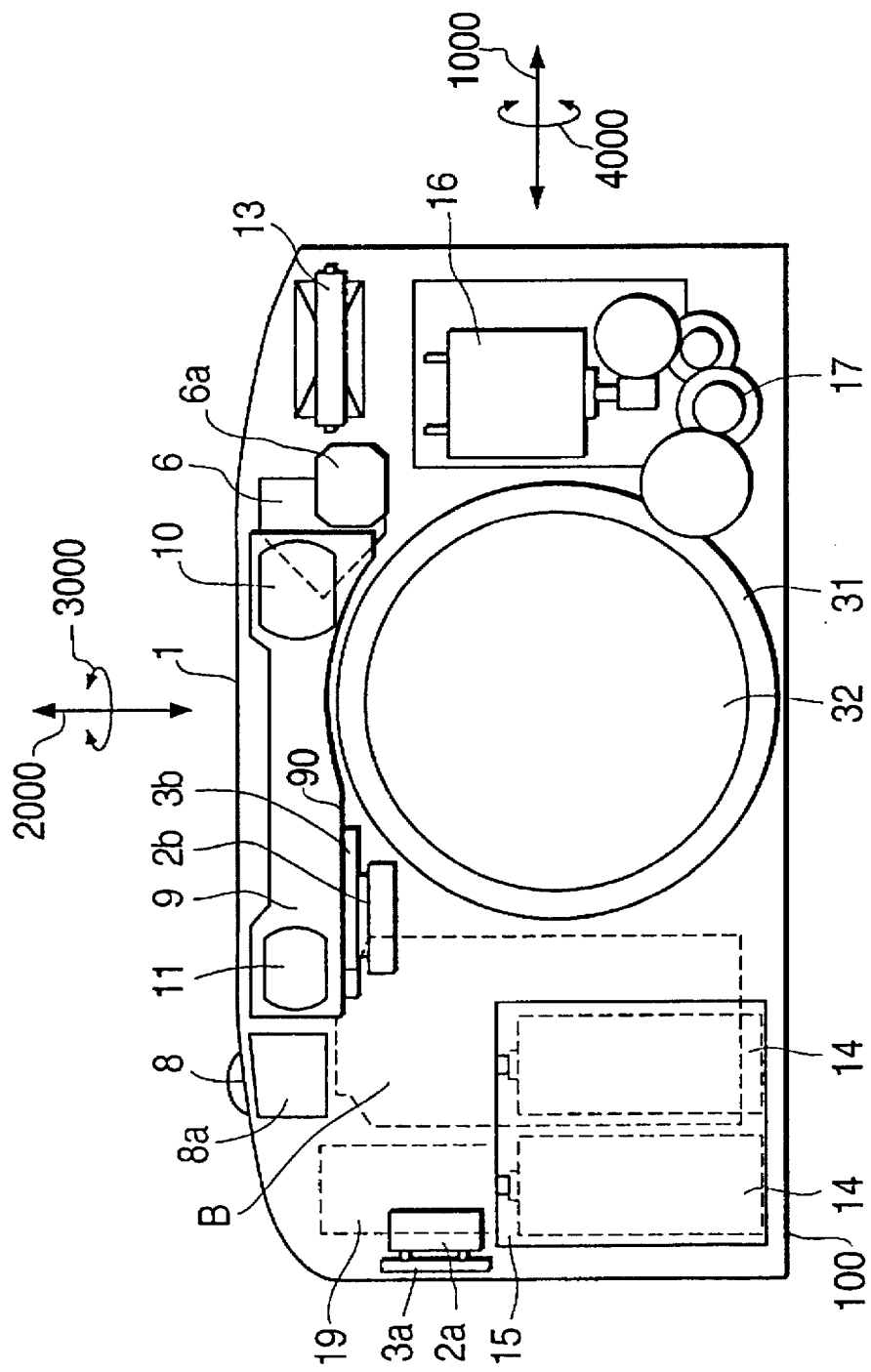

CAMERA WITH IMPROVED POSITIONING OF VIBRATION DETECTION SENSORS

This application is a continuation of application Ser. No. 08/377,989, filed Jan. 25, 1995, now abandoned.

BACKGROUND OF THE INVENTION

1. Field of the Invention

The present invention relates to a camera having a vibration correction mechanism which uses vibration detection sensors to detect, and compensate for, vibrations affecting the camera. More particularly, the present invention relates to the positioning of the vibration detection sensors to reduce camera size and to reduce the amount of electrical noise affecting the vibration detection sensors.

2. Description of the Related Art

A conventional camera can be equipped with a conventional vibration compensation device to detect vibrations affecting the camera and to compensate for the detected vibrations. In this manner, the camera reduces or eliminates blurring of photographs caused by vibrations affecting the camera. The vibration compensation device typically includes a vibration detection sensor for detecting vibrations, such as those vibrations caused by "hand tremors" (that is, shaking of the photographer's hand). Conventional vibration detection sensors include angular velocity sensors, angular acceleration sensors and angle sensors.

A vibration detection sensor is usually built into the camera body or into the lens barrel. When the vibration detection sensor is built into the camera body, the vibration detection sensor is secured to a board, typically by being soldered to the board. The board is then secured to the camera body with, for example, screws. In this manner, the vibration detection sensor is secured inside the camera body.

The lens barrel includes a picture taking optical system having a compensation lens which is drivable in a direction perpendicular to the optical axis of a picture taking lens. When the vibration detection sensor detects a vibration, the vibration detection sensor outputs an electrical signal corresponding to the detected vibration. A computation circuit, which is built into the camera body, receives the electrical signal from the vibration detection sensor and computes a dislocation amount and a dislocation direction of the subject image in an image-forming plane as a result of the detected vibration. An actuator drives the compensation lens to negate the dislocation amount and dislocation direction of the subject image on the subject image plane.

As described above, a conventional vibration compensation device uses vibration detection sensors and a compensation lens. These components are added to a camera and thereby increase the camera size.

Moreover, a conventional camera typically includes a flash device which is built into the camera body and generates a significant amount of electrical noise. Unfortunately, the vibration detection sensors are highly susceptible to electrical noise and, as a result, the electrical noise generated by the flash device can cause the vibration detection sensors to become unreliable. To eliminate such instability, it is often necessary to attach an electrical noise prevention mechanism. However, an electrical noise prevention mechanism increases the camera size.

SUMMARY OF THE INVENTION

It is therefore an object of the present invention to provide a camera having vibration detection sensors built into the camera body and positioned so that the camera size is reduced.

It is a further object of the present invention to provide a camera having vibration detection sensors positioned inside the camera body so that the effect of electrical noise affecting the vibration detection sensors is reduced.

Objects of the present invention are achieved by providing a camera comprising a camera body having an outer cover and a lens barrel having a substantially cylindrical outer portion and being positioned on the camera body, the lens barrel dividing the camera body into a first portion and a second portion with the lens barrel therebetween. A rangefinding unit is positioned in the camera body and is covered by the outer cover of the camera body, the rangefinding unit having a surface which has a portion opposing the circumference of the outer portion of the lens barrel. A first space exists in the first portion of the camera body and has borders defined by the circumference of the outer portion of the lens barrel, the surface of the rangefinding unit and the outer cover of the camera body. A flash generation device is positioned in the second portion of the camera body and a vibration detection sensor is positioned in the first space.

BRIEF DESCRIPTION OF THE DRAWINGS

These and other objects and advantages of the invention will become apparent and more readily appreciated from the following description of the preferred embodiments, taken in conjunction with the accompanying drawings, of which:

FIG. 11 is a front view of a camera according to a sixth embodiment of the present invention.

DESCRIPTION OF THE PREFERRED EMBODIMENTS

Camera technology is directed to reducing the size of cameras and to provide multiple camera functions in order to meet increasing consumer demand for smaller, multi-function cameras. Therefore, camera designers must determine optimum locations of various components for reducing camera size. Thus, a camera designer should carefully consider the locations of a vibration compensation device and vibration sensors. Also, since vibration detection sensors are susceptible to electrical noise, it is necessary to consider a location for the vibration detection sensors so that the influence of electrical noise on the vibration detection sensors is minimized.

Camera components which require a relatively large space in the camera body include a cartridge chamber for housing a film cartridge, a spool chamber for winding the photographic film, and a battery chamber for housing a battery. Due to technological advances, conventional camera batteries have become smaller. Therefore, a smaller conventional battery can be located so that it is approximately perpendicular with the bottom of the camera, thereby developing a new space in the upper part of the battery chamber in comparison with cameras which use larger conventional batteries. Moreover, a housing of a lens barrel of the picture taking lens typically has a substantially cylindrical shape. Thus, space tends to develop between the housing of the lens barrel and the components arranged inside the lens barrel.

Figure 1:
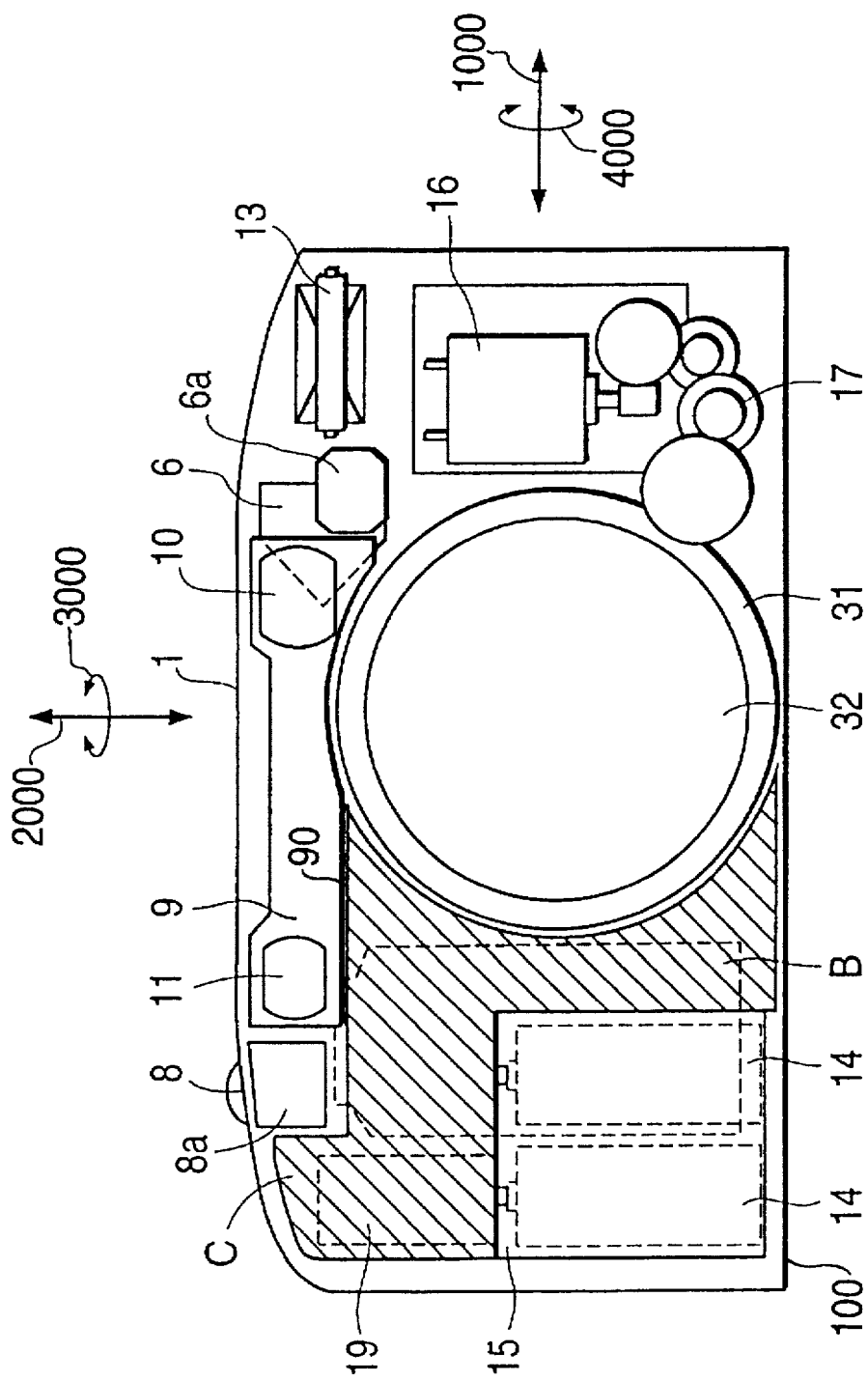
FIG. 1 is a front view of a camera and illustrates various spaces inside the camera, according to embodiments of the present invention.
Figure 2:
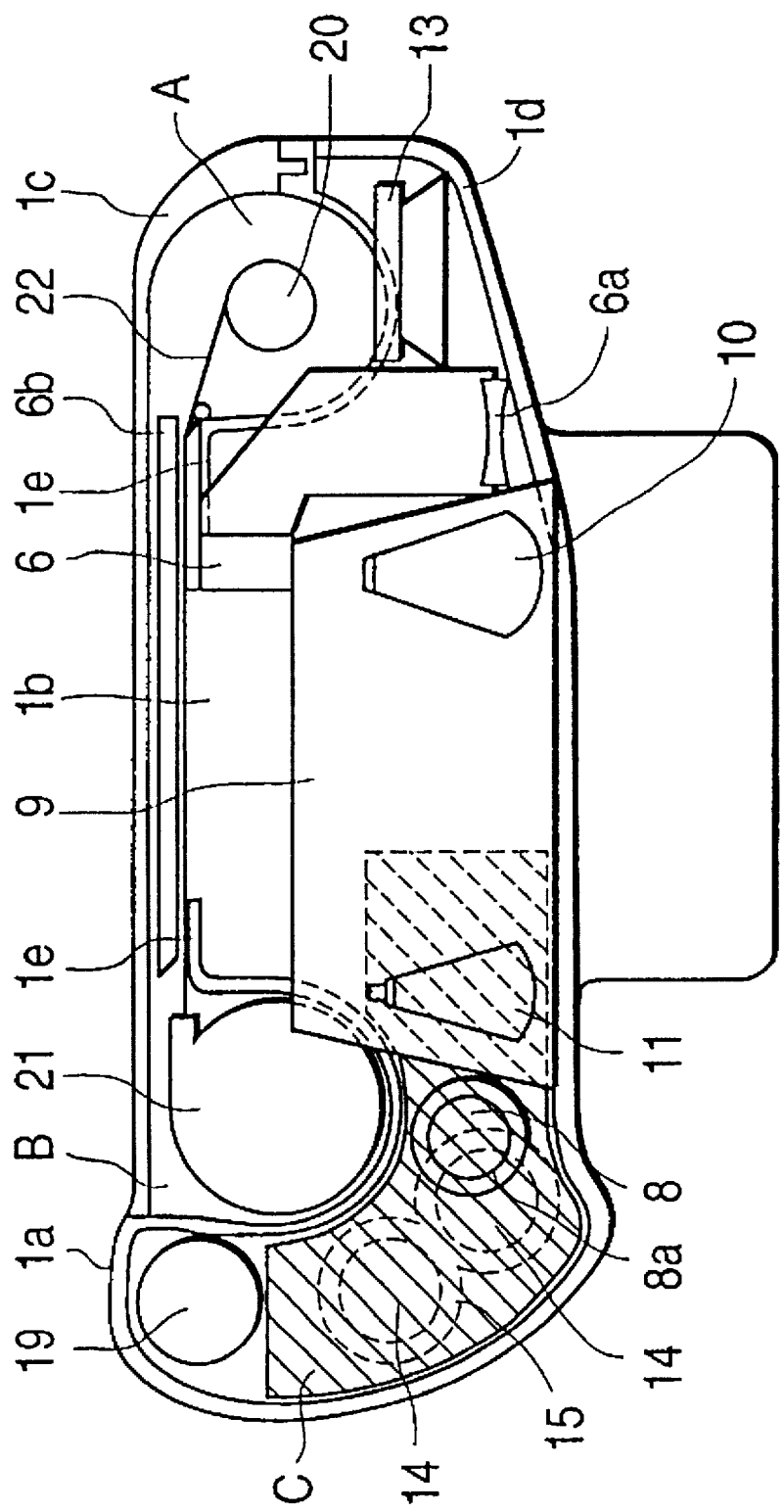
FIG. 2 is a top view of the camera illustrated in FIG. 1, and illustrates various spaces inside the camera, according to embodiments of the present invention.

Reference is now made to the figures, wherein like reference numerals represent similar structures or processes throughout the drawings, and more particularly to FIGS. 1–4, which illustrate various spaces and components inside a camera according to embodiments of the present invention. FIG. 1 illustrates the horizontal direction, 1000 vertical direction, 2000 yawing direction 3000 and pitching direction 3000 of the camera. Further, FIG. 1 represents a "front" view or "subject side" view of the camera. This is, FIG. 1 represents a view of the camera when looking at the camera from the position of a photographic subject. Therefore, the term "front side" or "subject side" of the camera refers to the side of the camera facing a photographic subject when the camera is pointed at the photographic subject. Referring specifically to FIGS. 1 and 2, a conventional lens barrel 31 is positioned on a camera body 1. Lens barrel is preferably positioned in the center of camera body 1 and divides camera body 1 into a first portion (the left side of the camera, as illustrated in FIG. 1 ) and a second portion (the right side of the camera, as illustrated in FIG. 1 ) with lens barrel 31 therebetween. Camera body 1 has a front body 1d, a rear body 1e and a bottom surface 100. Thus, front body 1d and bottom surface 100, together with a portion of camera body 1 on the top of the camera, form an outer cover of camera body 1 which encloses components within the camera. Lens barrel 31 comprises a conventional picture taking lens 32. A conventional viewfinder unit 6 comprises an objective lens 6a and an eyepiece 6b and allows a photographer to view a subject. A conventional rangefinding unit 9 detects the range to a subject and comprises a conventional infrared light emitter unit 10 and a conventional infrared light reception unit 11. Rangefinding unit 9 is able to measure the distance to the subject by a conventional triangulation method. Measurement accuracy increases as infrared light emitter unit 10 and infrared light reception unit 11 are positioned farther apart. For this reason, rangefinding unit 9 has a fixed width between infrared light emitter unit 10 and infrared light reception unit 11. A conventional motor 16 is connected to a conventional gear drive unit 17 to drive lens barrel 31. A conventional shutter button 8 can be pushed to a half-push position or a full-push position. Shutter button 8 is connected to a conventional release unit 8a which comprises, for example, a conventional half-push switch (not illustrated) which initiates various electronic circuits within the camera when shutter button 8 is pressed to the half-push position. Release unit 8a also comprises a conventional release switch (not illustrated) which initiates a conventional exposure operation when shutter button 8 is pushed to the full-push position.

A battery chamber 15 houses batteries 14, which supply power to components in camera body 1. A conventional strobe capacitor 19 stores power and is connected to a conventional strobe emitter unit 13 for generating an electric flash. Strobe emitter unit 13 can also be referred to as a "flash generation device". Strobe capacitor 19 is connected to strobe emitter unit 13 by wiring (not illustrated) and a conventional flash operation is possible due to the electric power stored in strobe capacitor 19. A cartridge chamber B steadily holds a film cartridge 21. A spool chamber A holds a spool 20 and houses a conventional built-in film feed motor (not illustrated). Photographic film 22 is wound into the spool 20 in spool chamber A. Cartridge chamber B and spool chamber A are attached to rear body 1e. Cartridge chamber B and spool chamber A are positioned so that they flank an aperture 1b.

A rear cover 1c is linked to rear body 1e and is able to open and close in a conventional manner. Lens barrel 31 has a conventional vibration compensation function and is attached to the center of front body 1d. Lens barrel 31 is preferably formed as a single unit with front body 1d, although lens barrel 31 can be detachable from camera body 1. As shown in FIG. 1, release unit 8a is positioned below shutter button 8. A grip portion 1a of camera body 1 is formed into a shape which makes it easy for a photographer to hold the camera. Grip portion 1a is formed in a section of the camera which is flanked by the outer wall of rear body 1e and front body 1d at the front side (subject side) of cartridge chamber B. Strobe capacitor 19 and battery chamber 15 are positioned inside grip portion 1a.

Rangefinding unit 9 is positioned so that it almost comes into contact with the upper side of lens barrel 31. A surface 90 of rangefinding unit 9 opposes the circumference of lens barrel 31. Infrared light emitter unit 10 and infrared light receptor unit 11 are positioned on rangefinding unit 9. Viewfinder unit 6 is positioned on the right-side of the camera as seen from the front view of the camera. Motor 16 and gear drive unit 17 are positioned on the front side (subject image side) of spool chamber A. Also, strobe emitter unit 13 is positioned adjacent to viewfinder unit 6 and above spool chamber A. Devices such as the motor (not illustrated) of the vibration compensation mechanism (not illustrated) are positioned on the right-side as seen from the front view of the camera.

Strobe emitter unit 13 is also positioned on the right-side of the camera as seen from the front view of the camera. The vibration compensation mechanism motor and the strobe emitter unit 13 can be a source of electrical noise affecting small signals. Strobe emitter unit 13 is especially prone to generating noise since it performs a flash operation at a high voltage. Therefore, there is a possibility that electrical signals output by vibration detection sensors will be influenced by electrical noise generated by strobe emitter unit 13 or various motors when the vibration detection sensors are located near these electrical noise generating components.

Camera body 1 and picture taking lens 32 are preferably formed integrally as a unit. However, picture taking lens 32 can be detachable from camera body 1. Picture taking lens barrel 31 has a shape which is substantially cylindrical. Rangefinding unit is positioned so that it almost comes into contact with the upper part of picture taking lens barrel 31 in a plane which is approximately perpendicular with the bottom surface 100 of the camera. Thus, surface 90 of rangefinding unit 9 opposes the circumference of the outer portion of lens barrel 31. Strobe capacitor 19 is at the back of battery chamber 15. The size of strobe capacitor 19 becomes larger as the quantity of light of the flash of strobe emitter unit 13 becomes larger. Therefore, powerful flashes become possible when strobe capacitor 19 is made as large as possible. Here, the height of strobe capacitor 19 is made such that it approaches the height of camera body 1, which reaches the upper cover and the lower cover. The upper cover and the lower cover are the outer covers which form the outside of camera body 1.

A shaded section C represents a space which circumvents release unit 8a and battery chamber 15 and is on a side of camera body 1 opposite strobe emitter unit 13. If a straight line (not illustrated) connects a photoemitter window of infrared light emitter unit 10 and a photoreceptor window of infrared light receptor unit 11, and a perpendicular line (not illustrated) is perpendicular to, and intersects, the straight line, strobe emitter unit 13 can be described as being to one side of the perpendicular line and shaded section C can be described as being to the other side of the perpendicular line. If vibration detection sensors are located inside this shaded section C, the vibration detection sensors will be separated from the sources of electrical noise and the influence of electrical noise on the vibration detection sensors will be reduced.

Figure 3:
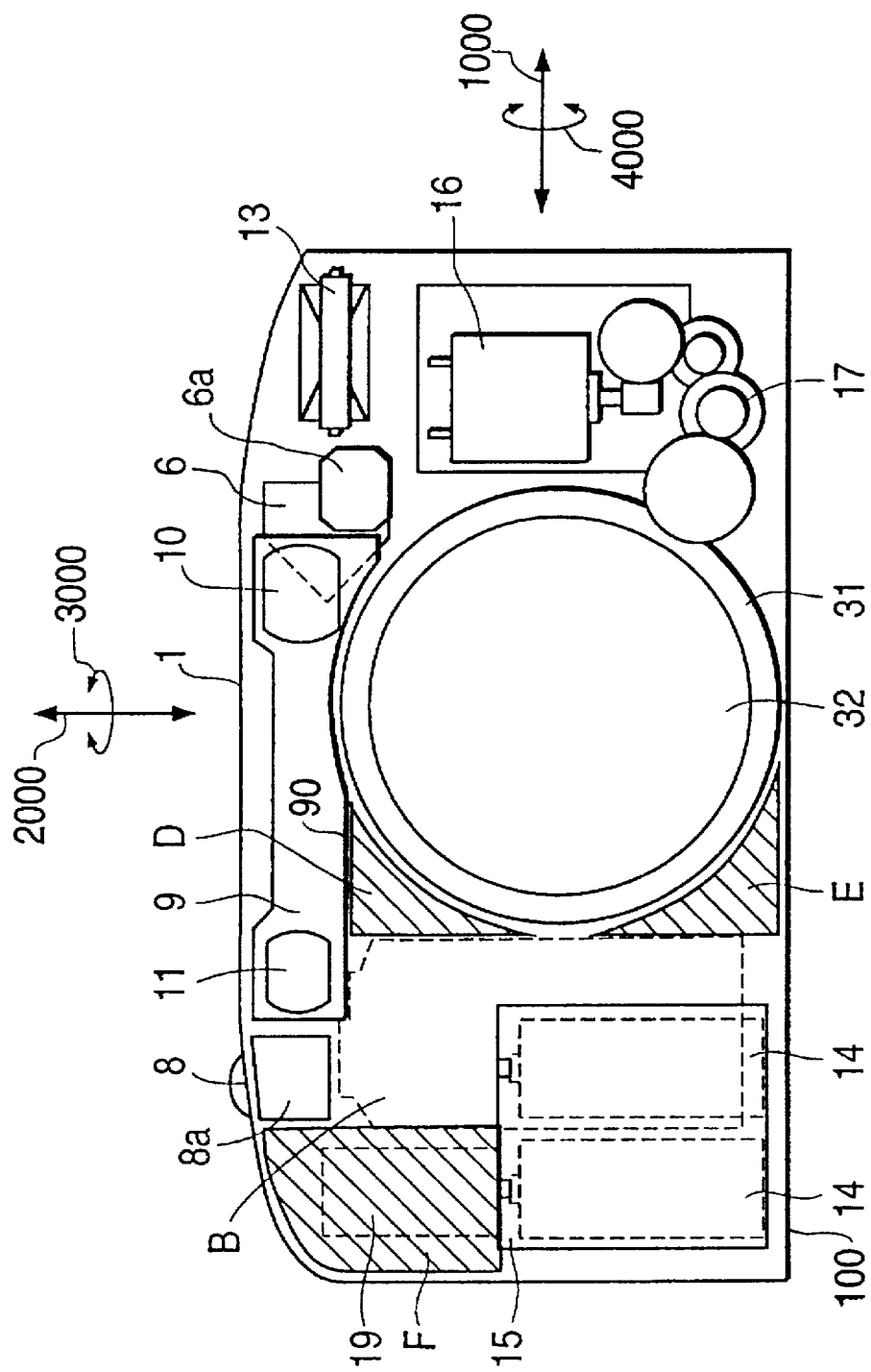
FIG. 3 is a front view of a camera and illustrates various spaces inside the camera, according to embodiments of the present invention.
Figure 4:
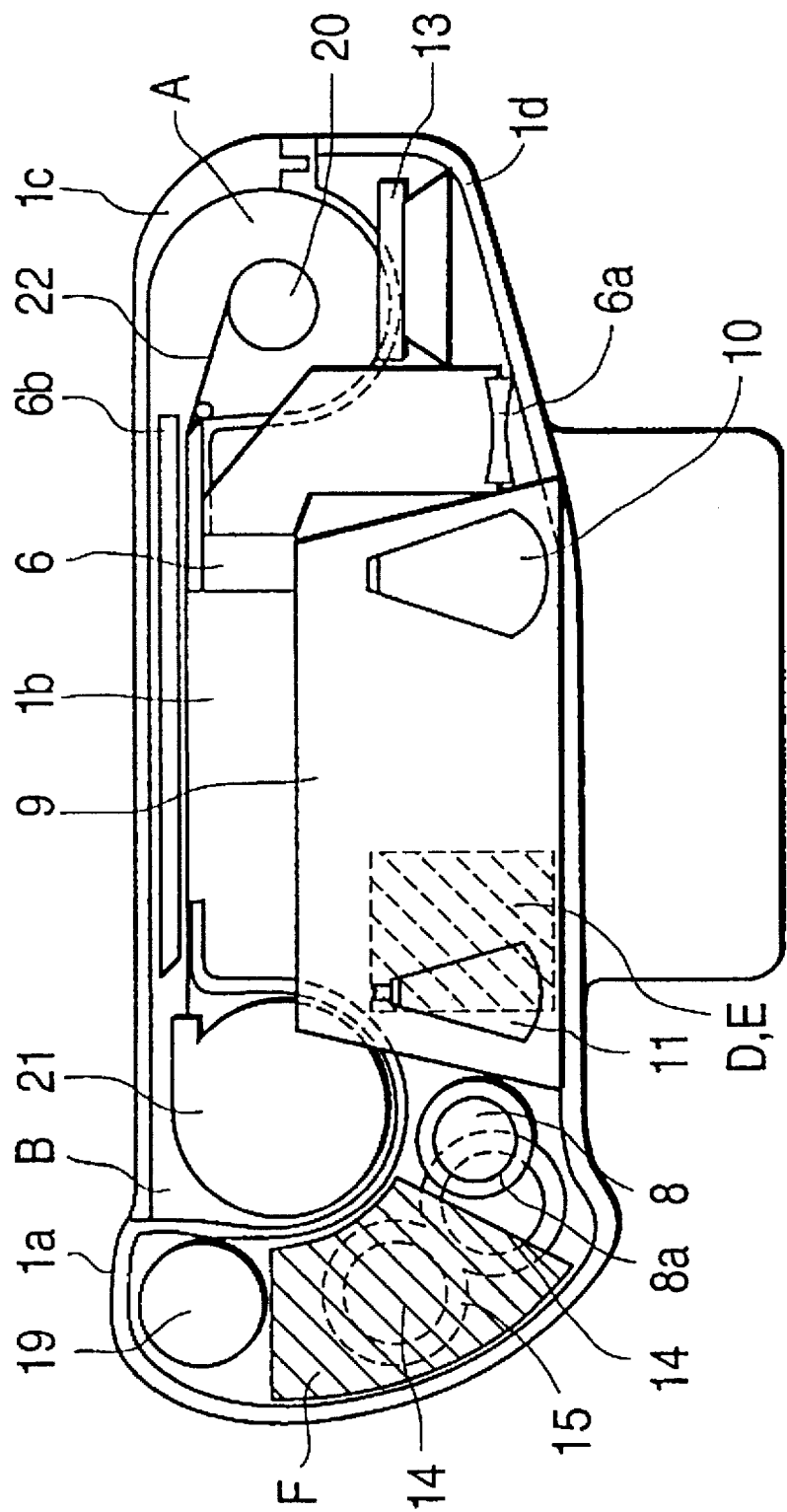
FIG. 4 is a top view of the camera illustrated in FIG. 3, and illustrates various spaces inside the camera, according to embodiments of the present invention.

FIG. 3 is a front view of a camera according to embodiments of the present invention, and FIG. 4 is a top view of the camera illustrated in FIG. 3, according to embodiments of the present invention. As illustrated in FIGS. 3 and 4, a shaded section D represents a space located between lens barrel 31 and rangefinding unit 9. Also, a shaded section E represents a space located between picture taking lens barrel 31 and the bottom surface 100 of camera body 1. Batteries 14 are conventional batteries which have been conventionally made more compact. This improved compactness of conventional batteries has led to the formation of a space such as shaded section F between the height of strobe capacitor 19 and the height of battery 14. Here, shaded sections D, E and F are spaces which cannot be eliminated to make the external appearance of the camera more compact. Therefore, by using shaded sections D, E and F to position vibration detection sensors, it becomes possible to minimize new space required for the positioning of vibration detection sensors.

A camera as illustrated in FIGS. 3 and 4 can be described as having an optical axis extending through lens barrel 31, wherein the optical axis divides shaded section C to form shaded section D and shaded section E. Shaded section D has borders defined by the surface 90 of rangefinding unit 9, the circumference of the outer portion of lens barrel 31 and the outer cover of camera body 1. Shaded section E has borders defined by the bottom surface 100 of camera body 1, the circumference of the outer portion of lens barrel 31 and the outer cover of camera body 1. Moreover, battery compartment 15 is positioned in the first portion of camera body 1 and is covered by the outer cover of camera body 1. Shaded section F is formed between the top surface of the outer cover and the top of a battery when a battery is positioned in battery compartment 15.

Referring to FIGS. 1–4, shaded section C can be described as a "first space". Shaded section D can be described as a "first subspace" existing within shaded section C. Shaded section E can be described as a "second subspace" existing within shaded section C. Shaded section F can be described as a "third subspace" existing within shaded section C.

Figure 5:
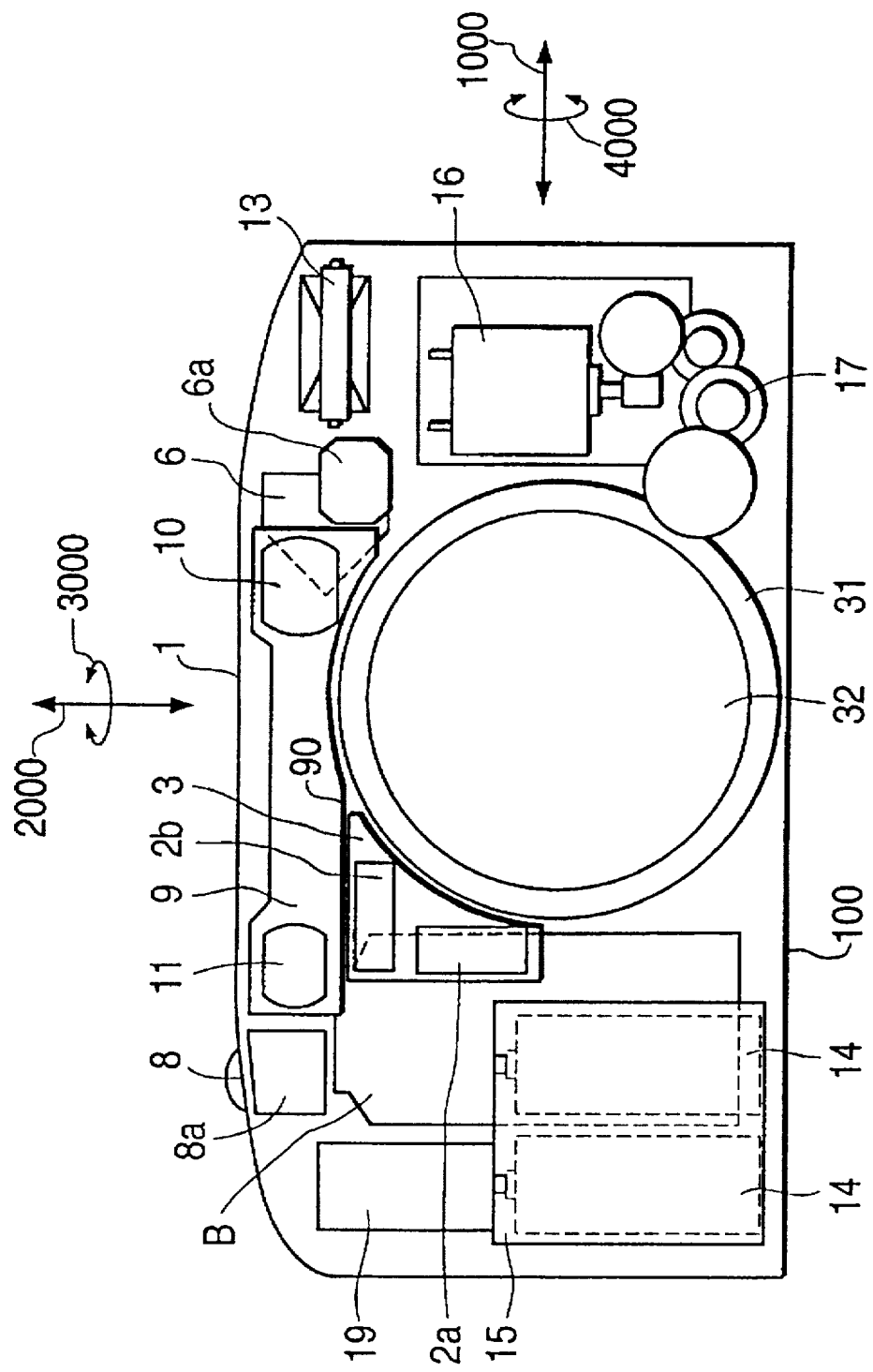
FIG. 5 is a front view of a camera according to a first embodiment of the present invention.
Figure 6:
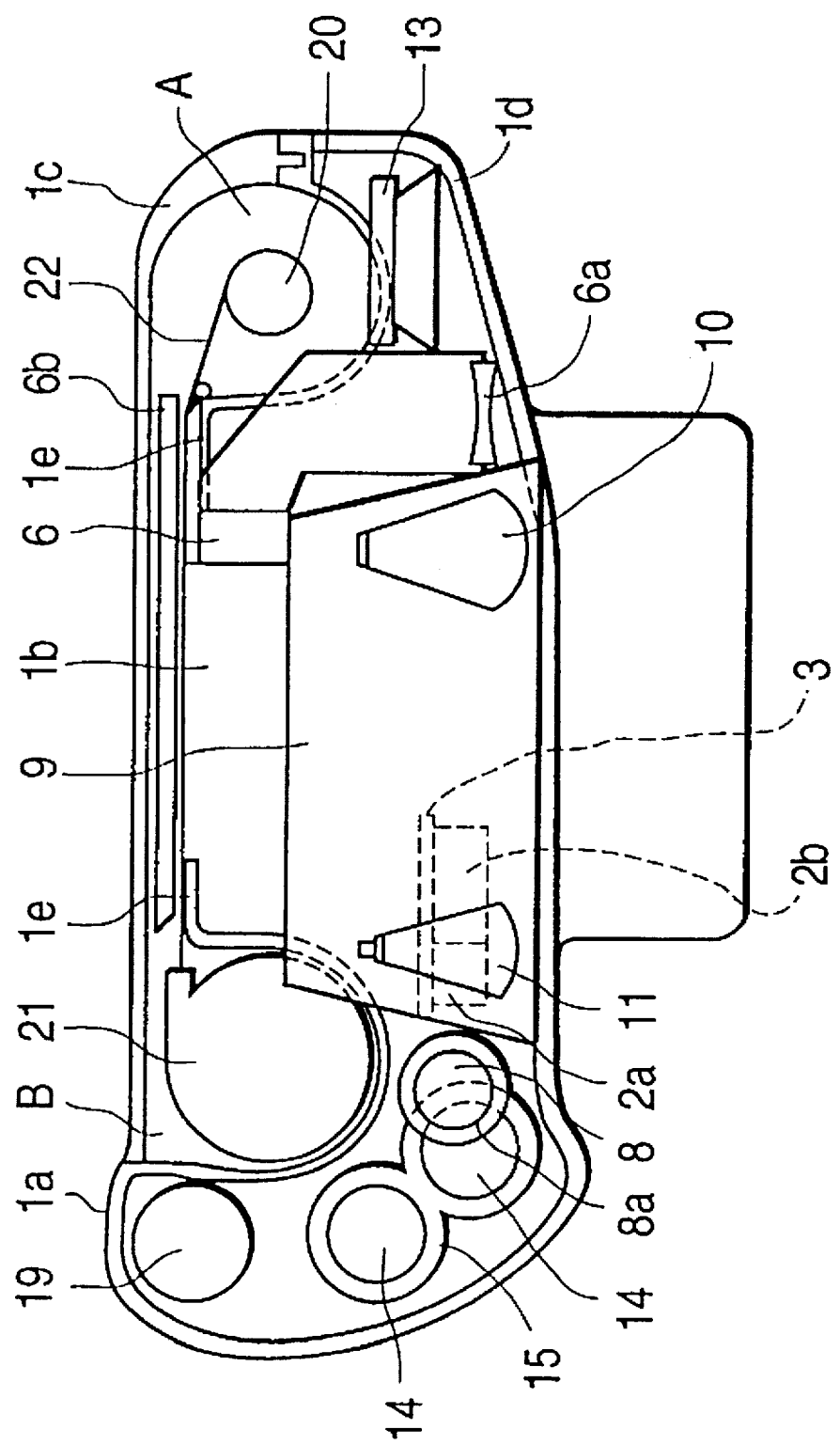
FIG. 6 is a top view of a camera according to the first embodiment of the present invention.

FIGS. 5 and 6 illustrate a camera according to a first embodiment of the present invention, wherein an object of a camera according to the first embodiment of the present invention is to reduce the influence of electrical noise from such devices as strobe capacitor 19 and strobe emitter unit 13 and to prevent increases in the size of the camera. FIG. 5 is a front view of a camera according to the first embodiment of the present invention, and FIG. 6 is a top view of a camera according to the first embodiment of the present invention.

Angular velocity sensors 2a and 2b detect the angular velocity in respective rotation directions corresponding to rotational movement of the camera. Angular velocity sensors 2a and 2b comprise respective oscillators (not illustrated) inside angular velocity sensors 2a and 2b. Angular velocity sensors 2a and 2b oscillate the oscillators at a specified vibration frequency. Angular velocity sensors 2a and 2b detect vibrations by using the vibration of this oscillation and the Coriolis force generated by a rotational movement created by vibrations from such sources as hand tremors. Angular velocity sensor 2a detects vibration in the yaw direction of camera body 1, and angular velocity sensor 2b detects vibration in the pitch direction of camera body 1. Angular velocity sensor 2a and angular velocity sensor 2b are mounted on a common board 3 so that a rotation detection axis (not illustrated) inside angular velocity sensor 2a and a rotation detection axis (not illustrated) inside angular velocity sensor 2b are approximately perpendicular.

Board 3 is positioned in shaded section D shown in FIGS. 3 and 4, so the effect of a camera according to the first embodiment of the present invention is to reduce the influence of electrical noise generated by strobe emitter unit 13 and to prevent an increase in the size of camera body 1. Thus, a camera according to the first embodiment of the present invention effectively utilizes space which was not utilized in conventional cameras.

As shown in FIG. 5, angular velocity sensor 2a and angular velocity sensor 2b are located on the same board 3. Board 3 is parallel with the photographic film plane (not illustrated) and is positioned so that it almost comes into contact with lens barrel 31 at a location just below rangefinding unit 9. Strobe emitter unit 13 and viewfinder unit 6 are located at the upper right of the camera, as seen from the front view of the camera. Rangefinding unit 9 is positioned to the left of the center of the camera, as seen from the front view of the camera. A space for angular velocity sensors 2a and 2b exists below rangefinding unit 9 in shaded section D (see FIGS. 3 and 4). Using shaded section D, angular velocity sensor 2a is mounted on board 3 at a position where lens barrel 31 and an edge of angular velocity sensor 2b almost come into contact, where the lower surface of rangefinding unit 9 and the rotation detection axis inside angular velocity sensor 2b are substantially parallel. Angular velocity sensor 2a and angular velocity sensor 2b almost come into contact with lens barrel 31. Moreover, angular velocity sensors 2a and 2b are formed as a single unit by mounting them on a common board 3 in a position where the rotation detection axis inside angular velocity sensor 2a and the rotation detection axis inside angular velocity sensor 2b are substantially perpendicular. Therefore, assembly and angle adjustment is simplified. In this manner, by effectively utilizing space which was conventionally wasted, it is possible to prevent increases in the size of the camera body. Moreover, board 3 is located in the range indicated by shaded section D (see FIGS. 3 and 4), so that board 3 is separated from sources of electrical noise, such as motor 16 and strobe emitter unit 13. Therefore, the influence of electrical noise on the output signals of angular velocity sensor 2a and angular velocity sensor 2b is reduced.

In summary, a camera according to the first embodiment of the present invention comprises a camera body 1 having an outer cover and a lens barrel 31 having a substantially cylindrical outer portion and being positioned on camera body 1. Lens barrel 31 divides the camera body into a first portion (for example, the left side of the camera in FIG. 5) and a second portion (for example, the right side of the camera in FIG. 5) with lens barrel 31 therebetween. A rangefinding unit 9 is positioned in camera body 1 and is covered by the outer cover of camera body 1. Rangefinding unit 9 has a surface 90 which has a portion opposing the circumference of the outer portion of lens barrel 31. A first space (shaded section C) exists in the first portion of camera body 1 and has borders defined by the circumference of the outer portion of lens barrel 31, the surface 90 of rangefinding unit 9 and the outer cover of camera body 1. A flash generation device (strobe emitter unit 13) is positioned in the second portion of camera body 1. A vibration detection sensor (for example, either angular velocity sensor 2a or angular velocity sensor 2b) is positioned in the first space.

Figure 7:
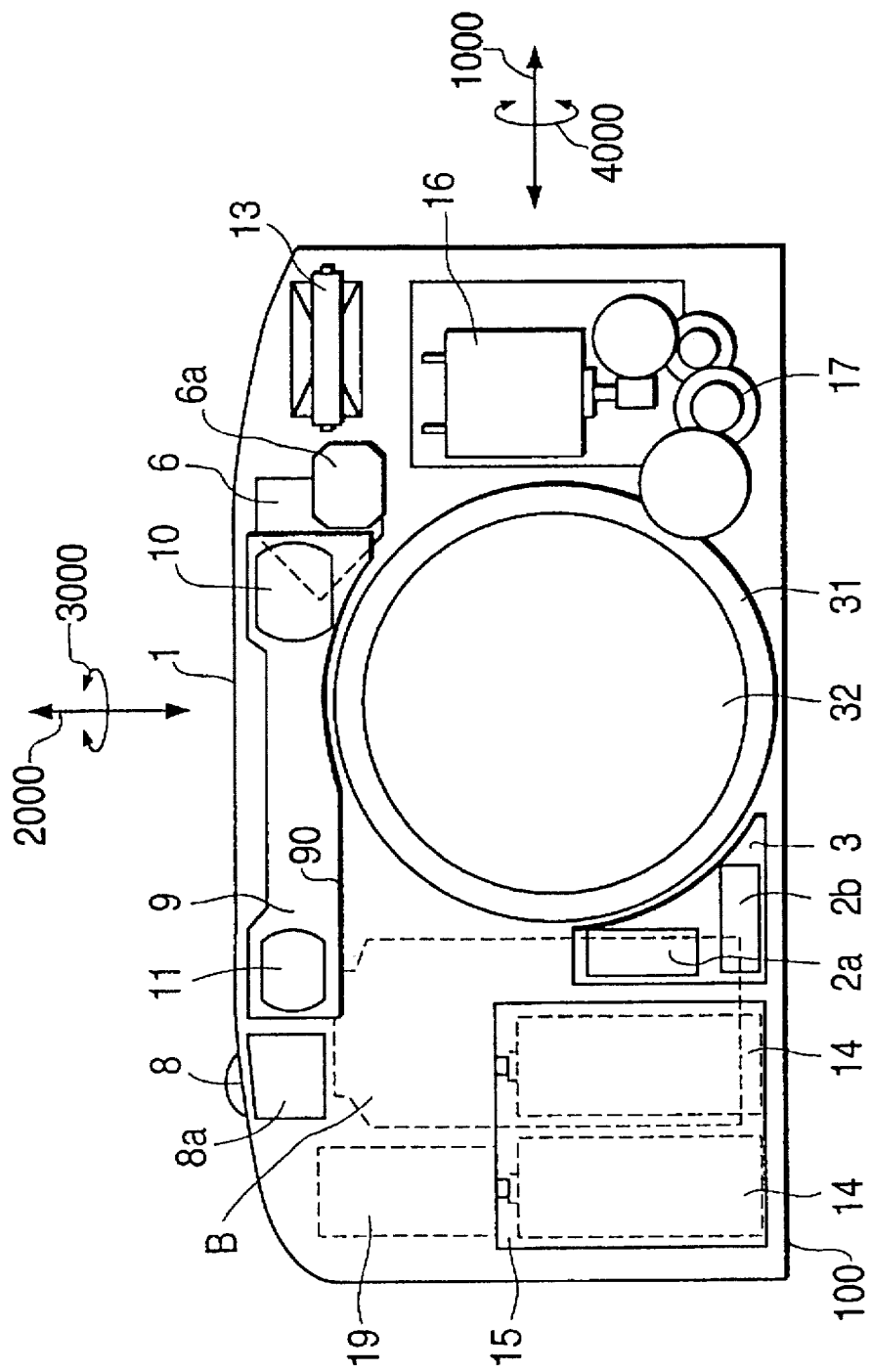
FIG. 7 is a front view of a camera according to a second embodiment of the present invention.

FIG. 7 is a front view of a camera according to a second embodiment of the present invention. As illustrated in FIG. 7, board 3 is positioned in shaded section E (see FIGS. 3 and 4), so the effect of a camera according to the second embodiment of the present invention is to reduce the influence of electrical noise generated by strobe emitter unit 13 and to prevent an increase in the size of camera body 1, by effectively utilizing space which could not be used in conventional cameras.

As shown in FIG. 7, angular velocity sensor 2a and angular velocity sensor 2b are attached to the same board 3. Board 3 is parallel with the photographic film plane (not illustrated) and is positioned so that it almost comes into contact with the bottom surface 100 of camera body 1 and lens barrel 31. Angular velocity sensor 2b is mounted on board 3 so that an edge of angular velocity sensor 2b almost comes into contact with lens barrel 31, where the rotation detection axis inside angular velocity sensor 2b is approximately parallel with the horizontal extension of the bottom of camera body 1. Moreover, angular velocity sensor 2b is mounted on board 3 such that the rotation detection axis inside angular velocity sensor 2a and the rotation detection axis inside angular velocity sensor 2b are substantially perpendicular and such that an edge of angular velocity sensor 2a almost comes into contact with lens barrel 31. Therefore, angular velocity sensors 2a and 2b are formed into a single unit mounted on the same board 3, thereby simplifying assembly and angle adjustment. In this manner, it becomes possible to prevent increases in the size of camera body 1 by effectively utilizing space which has conventionally been wasted. Also, board 3 is located in the range indicated by shaded section E (see FIGS. 3 and 4). Therefore, board 3 is separated from sources of electrical noise, such as motor 16 and strobe emitter unit 13. As a result, angular velocity sensor 2a and angular velocity sensor 2b, which are mounted on board 3, are separated from sources of electrical noise.

In summary, in a camera according to the second embodiment of the present invention, angular velocity sensors 2a, 2b are positioned in the space C formed between the outer circumference of lens barrel 31, any of the surfaces which form an outer surface of rangefinding unit 9, and the outer cover which forms the outer surface of camera body 1, in the area on the side opposite strobe emitter unit 13. Thus, angular velocity sensors 2a, 2b are on either side of the optical axis of the picture taking optical system comprising picture taking lens 32 as embodied herein. Also, the angular velocity sensors 2a and 2b are positioned in the area on the side opposite strobe emitter unit 13 so that they are on either side of the optical axis of the picture taking optical system. In this manner, angular velocity sensors 2a and 2b can be located in the space which is farthest from strobe emitter unit 13.

Figure 8:
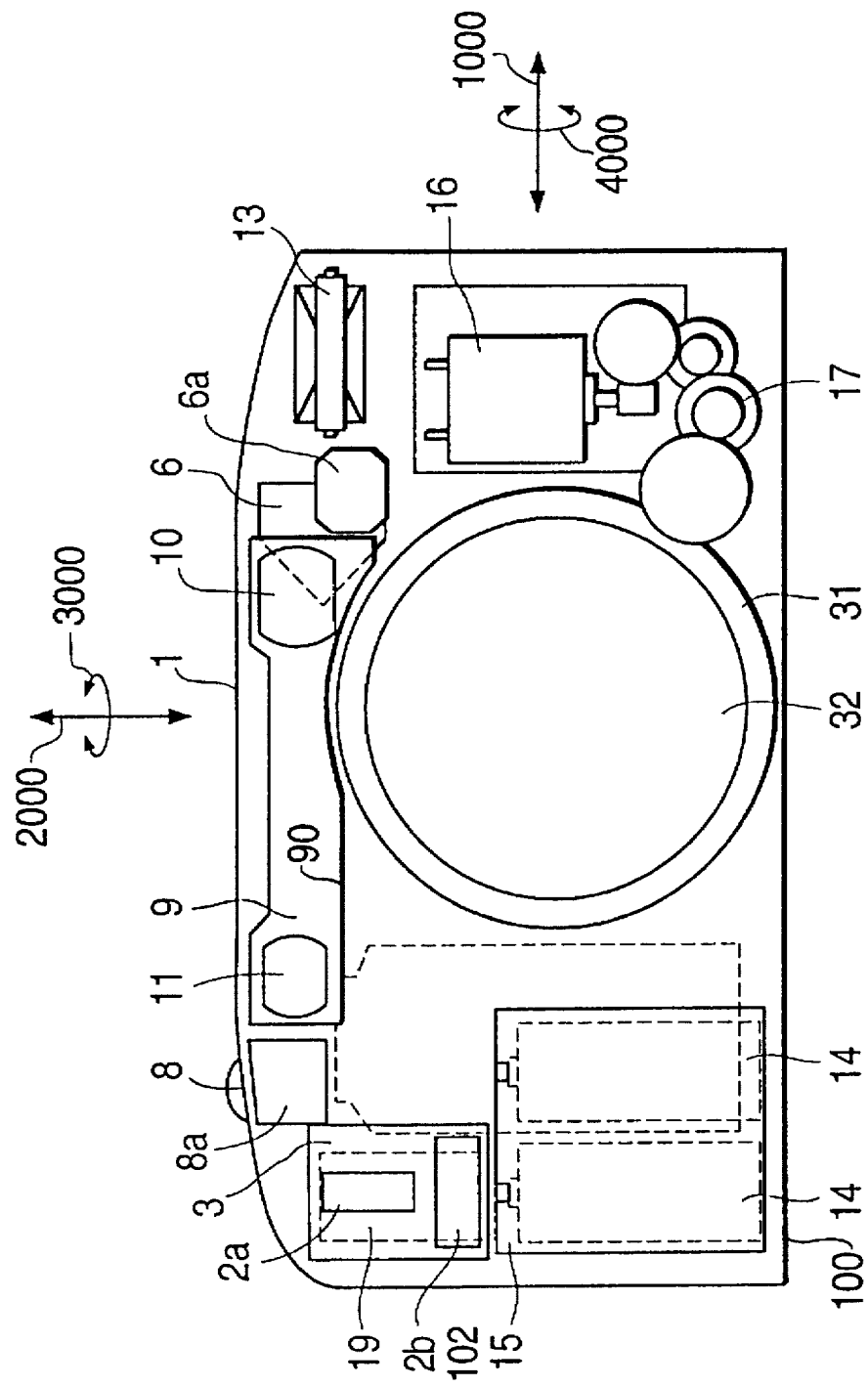
FIG. 8 is a front view of a camera according to a third embodiment of the present invention.

FIG. 8 is a front view of a camera according to a third embodiment of the present invention. As illustrated in FIG. 8, board 3 is positioned in shaded section F (see FIGS. 3 and 4) so that the effect of the third embodiment of the present invention is to reduce the influence of electrical noise generated by strobe emitter unit 13 and to prevent an increase in the size of the camera body 1 since space within camera body 1 is effectively utilized.

As shown in FIG. 8, angular velocity sensor 2a and angular velocity sensor 2b are attached to the same board 3. Board 3 is parallel with the photographic film plane (not illustrated) and is positioned so that it almost comes into contact with the upper surface of battery chamber 15 and so that it almost comes into contact with the top of camera body 1, release unit 8a, and the left side of camera body 1 as seen from the front view of the camera. Mounting of angular velocity sensors 2a and 2b is such that the rotation detection axis inside angular velocity sensor 2a and the rotation detection axis inside angular velocity sensor 2b are approximately perpendicular. As shown in FIG. 8, a side 102 of board 3 which is parallel with the rotation detection axis inside angular velocity sensor 2b almost comes into contact with battery chamber 15.

In this manner, angular velocity sensors 2a and 2b are formed into a unit by being mounted on the same board 3, thereby simplifying assembly and angle adjustment. Thus, it is possible to prevent increases in the size of the camera body by effectively utilizing space which was conventionally wasted. Also, board 3 is located in shaded section F (see FIGS. 3 and 4) so that board 3 is separated from sources of electrical noise, such as motor 16 and strobe emitter unit 13.

Figure 9:
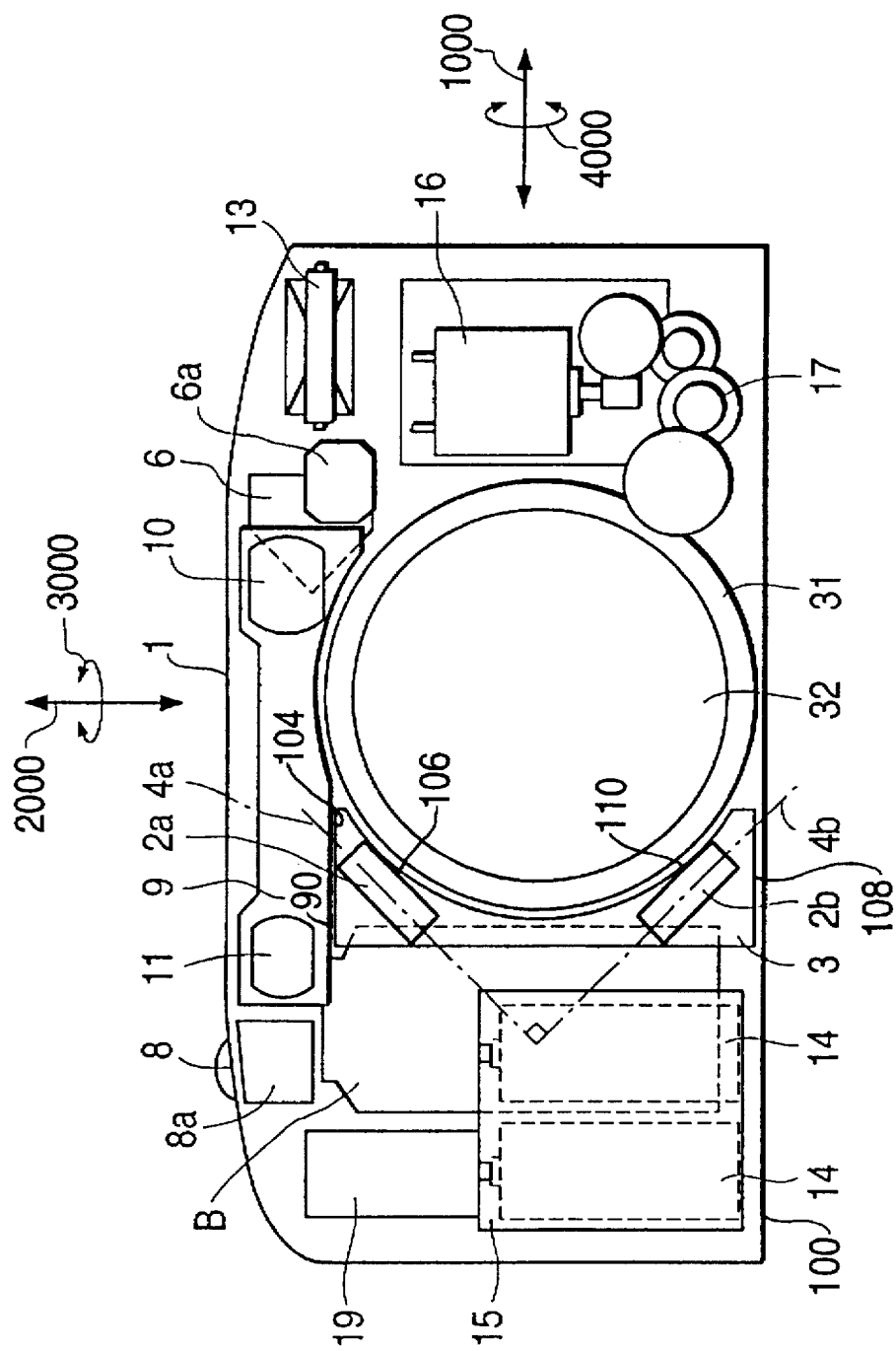
FIG. 9 is a front view of a camera according to a fourth embodiment of the present invention.

FIG. 9 is a front view of a camera according to a fourth embodiment of the present invention. As illustrated in FIG. 9, board 3 is larger than in the above-described first, second and third embodiments of the present invention, and extends into both shaded section D (see FIGS. 3 and 4) and shaded section E (see FIGS. 3 and 4). As illustrated in FIGS. 1–4, shaded section D and shaded section E exist in shaded section C. Therefore, the effect of the fourth embodiment of the present invention is to reduce the influence of electrical noise generated by the strobe emitter unit 13 and to prevent an increase in the size of the camera body 1. As shown in FIG. 9, angular velocity sensor 2a and angular velocity sensor 2b are attached to the same board 3. Board 3 is parallel with the photographic film plane (not illustrated) and is positioned so that it almost comes into contact with the bottom of rangefinding unit 9, lens barrel 31, and the bottom surface 100 of camera body 1. The rotation detection axis 4a of angular velocity sensor 2a and the rotation detection axis 4b of angular velocity sensor 2b are substantially perpendicular, and the positions of each of the rotation detections axes 4a and 4b are at approximately a 45-degree angle relative to the horizontal direction of the camera. As illustrated in FIG. 9, angular velocity sensor 2a is mounted on board 3 so that one edge 104 of board 3 approximately comes into contact with rangefinding unit 9 and so that part of the side 106 of board 3 that is parallel to rotation detection axis 4a approximately comes into contact with lens barrel 31. Also, angular velocity sensor 2b is mounted on board 3 so that one edge 108 of board 3 comes into contact with bottom surface 100 of camera body 1 and so that part of the side 110 of board 3 that is parallel to rotation detection axis 4b comes into contact with lens barrel 31. In this manner, it is possible to locate board 3 in a space in shaded section D and shaded section E shown in FIG. 3. Further, angular velocity sensors 2a and 2b are formed as a single unit by being mounted on a common board 3, thereby simplifying assembly and angle adjustment. Moreover, it is possible to prevent increases in the size of the camera body by effectively utilizing the space of the range of shaded section D and shaded section E.

Figure 10:
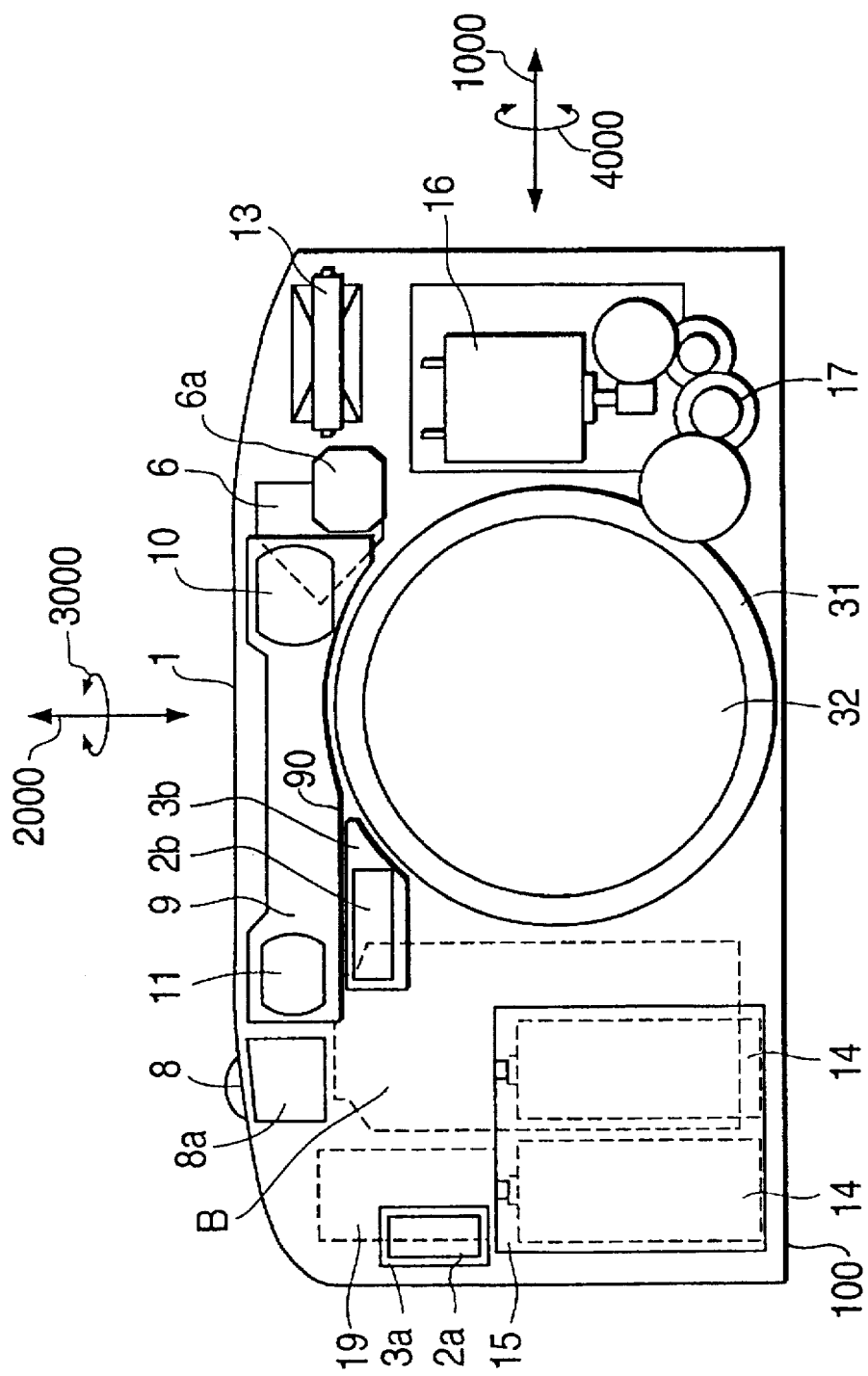
FIG. 10 is a front view of a camera according to a fifth embodiment of the present invention.

FIG. 10 is a front view of a camera according to a fifth embodiment of the present invention. In a camera according to the fifth embodiment of the present invention, angular velocity sensor 2a mounted on a corresponding board 3a and angular velocity sensor 2b is mounted on a corresponding board 3b. Angular velocity sensor 2a and angular velocity sensor 2b are separately located in shaded section F and shaded section D, respectively. Shaded section F and shaded section D both exist in shaded section C shown in FIGS. 1 through 4. An effect of the fifth embodiment of the present invention is that the degree of freedom of the positioning of boards 3a and 3b is increased. Increases in the size of camera body 1 are prevented since space which could not be used in conventional cameras is effectively utilized, and the influence of the electrical noise generated by strobe emitter unit 13 is reduced.

As shown in FIG. 10, angular velocity sensor 2a, which detects vibration in the yaw direction of camera body 1, is attached to board 3a. Also, angular velocity sensor 2b, which detects vibration in the pitch direction of the camera body 1, is attached to board 3b. Board 3a and board 3b are both parallel with the photographic film plane (not illustrated). Board 3a is positioned so that it almost comes into contact with the upper surface of battery chamber 15 and so that it almost comes into contact with the left-side of camera body 1, as seen from the front view of the camera. Board 3b is positioned so that it almost comes into contact with lens barrel 31 just below rangefinding unit 9. Angular velocity sensor 2a is mounted so that a side which is approximately parallel with the rotation detection axis (not illustrated) of angular velocity sensor 2a almost comes into contact with the left-side of camera body 1, as seen from the front view of the camera, and so that one edge of angular velocity sensor 2a approximately comes into contact with the upper surface of battery chamber 15. The rotation detection axis (not illustrated) of angular velocity sensor 2b and the bottom surface 100 of camera body 1 are substantially parallel. Angular velocity sensor 2b is mounted on board 3b so that one edge of angular velocity sensor 2b approximately comes into contact with lens barrel 31 and so that a side of angular velocity sensor 2b which is substantially parallel with the rotation detection axis of angular velocity sensor 2b almost comes into contact with rangefinding unit 9. Moreover, the rotation detection axis of angular velocity sensor 2a and the rotation detection axis of angular velocity sensor 2b are substantially perpendicular. Thus, angular velocity sensor 2a and angular velocity sensor 2b are separately mounted on different boards 3a and 3b, respectively, and the degree of freedom with respect to the size of a respective board increases along with the space. As a result, it becomes possible to prevent increases in the size of camera body 1 because space which was conventionally wasted is effectively utilized. Moreover, board 3a and board 3b are located in shaded section F and shaded section D, respectively, (see FIGS. 3 and 4) so that board 3a and board 3b are separated from sources of electrical noise, thereby reducing the effect of electrical noise on angular velocity sensor 2a and angular velocity sensor 2b.

FIG. 11 is a front view of a camera according to a sixth embodiment of the present invention. As illustrated in FIG. 11, angular velocity sensors 2a and 2b are separately located in shaded section F and shaded section D, respectively. Shaded section F and shaded section D exist in shaded section C shown in FIGS. 1 through 4. Therefore, the effect of the sixth embodiment of the present invention is that the degree of freedom of the positioning of the board is broadened. Also, increases in the size of camera body 1 are prevented since space which could not be used in conventional cameras is effectively utilized. Moreover, the influence of the electrical noise generated by the strobe emitter unit 13 is reduced.

As shown in FIG. 11, a camera according to the sixth embodiment of the present invention is a modification of a camera according to the previously described fifth embodiment of the present invention. In the sixth embodiment of the present invention, board 3a and board 3b are in a plane which is perpendicular to the photographic film plane. As shown in FIG. 11, board 3a is positioned so that it almost comes into contact with the left-side of camera body 1 as seen from the front view of the camera. Also, board 3b is positioned so that it almost comes into contact with rangefinding unit 9. If board 3a and board 3b are positioned as shown in FIG. 11, it becomes possible to effectively utilize space, and it is possible to prevent increases in the size of camera body 1 resulting from newly attached components. Moreover, board 3a and board 3b are located in shaded section F and shaded section D, respectively, (see FIGS. 3 and 4) so that angular velocity sensors 2a and 2b are separated from sources of electrical noise.

In a camera according to the above embodiments of the present invention, a camera which has a vibration detection device is configured so that a board on which angular detection sensors are mounted is positioned in the space between the lens barrel and the rangefinding unit, the space between the lens barrel and the bottom surface of the camera body, or in the space above the battery chamber. By effectively utilizing these spaces, it becomes possible to prevent or reduce increases in the size of the camera which result from attaching new components to the camera.

In a camera according to the above-described embodiments of the present invention, vibration detection sensors 2a, 2b detect vibration affecting camera body 1. A picture taking optical system, such as picture taking lens 32, comprises a vibration compensation optical system (not illustrated) which moves to control subject image vibration in an image-forming plane according to the output of angular velocity sensors 2a and 2b. Rangefinding unit 9 has an opposing surface which opposes at least part of the outer circumference of lens barrel 31. A flash device, such as strobe emitter unit 13, is horizontally attached to rangefinding unit 9. In a camera according to a first embodiment of the present invention, angular detection sensors 2a and 2b are positioned in the space C formed between the outer circumference of lens barrel 31, the opposing surface of rangefinding unit 9, and the outer cover (which forms the outer surface) of camera body 1. Space C is on the side of the camera opposite to strobe emitter unit 13 and which centers on a perpendicular with respect to the opposing surface of the rangefinding unit 9 and which passes through a point in the opposing surface of the rangefinding unit 9. Angular velocity sensors 2a and 2b are positioned on the side of the camera which is opposite strobe emitter unit 13. Thus, angular velocity sensors 2a and 2b can be located in a space which is far from strobe emitter unit 13.

A camera according to the above embodiments of the present invention comprises vibration detection sensors. Vibration detection sensors have been described herein as being "angular velocity sensors"; however, the above embodiments are not intended to be limited to angular velocity sensors. A vibration detection sensor can be virtually any type of vibration detection sensor, such as, for example, angular acceleration detection sensors and angle sensors.

A camera according to the above embodiments of the present invention detects "vibration". "Vibration" is intended to be a general term referring to all types of vibration, including those resulting from hand tremors, electrical actuators inside the camera, and other forces exerted on the camera.

In a camera according to the above embodiments of the present invention, the vibration detection sensors are described as being mounted on a board. For example, angular velocity sensor 2b is described as mounted on board 3 and the board 3 is mounted on camera body 1. However, vibration detection sensors can be attached to the lens barrel or to other components inside the camera. Such attachment can be made by directly attaching the vibration detection sensor to a component or by mounting the vibration detection sensor on a board and attaching the board to a component. For example, a vibration detection sensor can be attached to the circumference of the outer portion of lens barrel 31 or to surface 90 of rangefinding unit 9.

Although a few preferred embodiments of the invention have been shown and described, it will be appreciated by those skilled in the art that changes may be made in these embodiments, without departing from the principles and the spirit of the invention, the scope of which is defined in the claims and their equivalents.

What is claimed is:

1. A camera comprising:

a camera body having an outer cover;

a lens barrel having a substantially cylindrical outer portion and being positioned on the camera body, the lens barrel dividing the camera body into a first portion and a second portion with the lens barrel between the first and second portions;

a rangefinding unit positioned in the camera body and being covered by the outer cover of the camera body, the rangefinding unit having a surface which has a portion adjacent to the circumference of the outer portion of the lens barrel, a first space existing in the first portion of the camera body and having borders defined by the circumference of the outer portion of the lens barrel, the surface of the rangefinding unit and the outer cover of the camera body, where an optical axis extends through the lens barrel and a plane passing through the optical axis divides the first space into first and second subspaces of substantially equal length in the optical axis direction, the first subspace has borders defined by the surface of the rangefinding unit, the circumference of the outer portion of the lens barrel and the outer cover of the camera body, and does not extend beyond the surface of the rangefinding unit, and the second subspace has borders defined by the bottom surface of the camera, the circumference of the outer portion of the lens barrel and the outer cover of the camera, and does not extend beyond the surface of the rangefinding unit;

a flash generation device positioned in the second portion of the camera body; and a vibration detection sensor positioned in one of the first and second subspaces, wherein no vibration detection sensor is positioned in the second portion of the camera body, thereby reducing the effect on vibration detection of electrical noise generated by the flash generation device.

2. A camera as in claim 1, further comprising:

first and second vibration detection sensors, the first vibration detection sensor being positioned in the first subspace and the second vibration detection sensor being positioned in the second subspace.

3. A camera as in claim 1, further comprising:

first and second vibration detection sensors; and a common board on which both the first and second vibration detection sensors are mounted, the first and second vibration detection sensors both being positioned in the first space.

4. A camera as in claim 2, further comprising a common board on which the first and second vibration detection sensors are mounted and which extends into both the first and second subspaces.

5. A camera as in claim 1, further comprising:

first and second vibration detection sensors which are both positioned in the first subspace.

6. A camera as in claim 5, wherein the first and second vibration detection sensors are both mounted on a common board.

7. A camera as in claim 1, further comprising;

first and second vibration detection sensors which are both positioned in the second subspace.

8. A camera as in claim 7, wherein the first and second vibration detection sensors are both mounted on a common board.

9. A camera as in claim 1, wherein the vibration detection sensor is attached to one of the circumference of the outer portion of the lens barrel and the surface of the rangefinding unit.

10. A camera as in claim 5, wherein the first and second vibration detection sensors are attached to one of the circumference of the outer portion of the lens barrel and the surface of the rangefinding unit.

11. A camera as in claim 1, wherein the vibration detection sensor has a rotation detection axis and detects vibrations by detecting a rotational movement centered around the rotation detection axis.

12. A camera as in claim 1, wherein the vibration detection sensor is one of the group comprising an angular velocity sensor, an angular acceleration sensor and an angle sensor.

13. A camera as in claim 1, further comprising first and second vibration detection sensors and a battery compartment for housing a battery, wherein:

the battery compartment is positioned in the first portion of the camera body and covered by the outer cover of the camera body, a third subspace existing within the first space and being formed between the top surface of the outer cover and the top of a battery when a battery is positioned in the battery compartment, the first vibration detection sensor being positioned in the first subspace and the second vibration detection sensor being positioned in the third subspace.

14. A camera as in claim 1, further comprising first and second vibration detection sensors and a battery compartment for housing a battery, wherein:

the battery compartment is positioned in the first portion of the camera body and covered by the outer cover of the camera body, a third subspace existing within the first space and being formed between the top surface of the outer cover and the top of a battery when a battery is positioned in the battery compartment, the first vibration detection sensor being positioned in the second subspace and the second vibration detection sensor being positioned in the third subspace.

15. A camera as in claim 13, further comprising:

a first board on which the first vibration detection sensor is mounted; and a second board on which the second vibration detection sensor is mounted.

16. A camera as in claim 6, wherein the first and second vibration detection sensors are positioned so that the first vibration detection sensor substantially extends in a direction which is perpendicular to the direction in which the second vibration detection sensor substantially extends.

17. A camera as in claim 8, wherein the first and second vibration detection sensors are positioned so that the first vibration detection sensor substantially extends in a direction which is perpendicular to the direction in which the second vibration detection sensor substantially extends.

18. A camera as in claim 2, wherein the first and second vibration detection sensors each have a respective rotation detection axis, and the rotation detection axis of the first vibration detection sensor is perpendicular to the rotation detection axis of the second vibration detection sensor.

19. A camera as in claim 4, wherein the first and second vibration detection sensors each have a respective rotation detection axis, and the rotation detection axis of the first vibration detection sensor is perpendicular to the rotation detection axis of the second vibration detection sensor.

* * * * *

UNITED STATES PATENT AND TRADEMARK OFFICE
CERTIFICATE OF CORRECTION

PATENT NO. : 5,634,143
DATED :
INVENTOR(S) : May 27, 1997

Yoshihisa KITAGAWA, et al

It is certified that error appears in the above-indentified patent and that said Letters Patent is hereby corrected as shown below:

Title Page
   Column 2, FOREIGN PATENT DOCUMENTS, delete "line 3, "5-61091 12/1993 Japan".

Column 12
   Line 29 (claim 7), ";" should be --:--.

Signed and Sealed this

Twenty-third Day of September, 1997

*Attest:*

BRUCE LEHMAN

*Attesting Officer*      *Commissioner of Patents and Trademarks*